United States Patent
Costa (10) Patent No.: US 8,965,048 B2
(45) Date of Patent: Feb. 24, 2015

(54) HEURISTIC MOTION DETECTION METHODS AND SYSTEMS FOR INTERACTIVE APPLICATIONS

(75) Inventor: Manuel Ricardo Fonseca Costa, Lisbon (PT)

(73) Assignee: Audience Entertainment, LLC, New York, NY (US)

( * ) Notice: Subject to any disclaimer, the term of this patent is extended or adjusted under 35 U.S.C. 154(b) by 161 days.

(21) Appl. No.: 13/601,164

(22) Filed: Aug. 31, 2012

(65) Prior Publication Data

US 2013/0077824 A1 Mar. 28, 2013

Related U.S. Application Data

(60) Provisional application No. 61/530,754, filed on Sep. 2, 2011.

(51) Int. Cl.
*G06T 7/20* (2006.01)
*A63F 13/20* (2014.01)
*G06K 9/00* (2006.01)

(52) U.S. Cl.
CPC ............ *G06K 9/00335* (2013.01); *A63F 13/06* (2013.01); *A63F 2300/1093* (2013.01); *A63F 2300/6045* (2013.01)
USPC .......................................... 382/103; 382/107

(58) Field of Classification Search
None
See application file for complete search history.

(56) References Cited

U.S. PATENT DOCUMENTS 5,680,487 A * 10/1997 Markandey .................... 382/291
2007/0280507 A1* 12/2007 Murali .......................... 382/107

OTHER PUBLICATIONS

Ambellouis et al. "Velocity Selective Spatio-Temporal Filters for Motion Analysis in Image Sequence." International Conference on Image Processing, vol. 1, Oct. 1998, pp. 231-235.*

* cited by examiner

*Primary Examiner* — Jon Chang
(74) *Attorney, Agent, or Firm* — Notaro, Michalos & Zaccaria P.C.

(57) ABSTRACT

Methods and systems for motion detection can be used with groups of elements, such as groups of people. Motion detecting includes acquiring a series of images including a current image and a previous image, and determining multiple optical flow vectors. The optical flow vectors each represent movement of one of several visual elements from a first location in the older image to a second location in the current image. Average velocities are determined and stored for the optical flow vectors for different time points. A motion index is calculated using the average velocities. The average velocities can be positive or negative. Filters can be applied to exclude selected images from the motion detection field.

18 Claims, 6 Drawing Sheets

HEURISTIC MOTION DETECTION METHODS AND SYSTEMS FOR INTERACTIVE APPLICATIONS

CROSS-REFERENCE TO RELATED APPLICATIONS

This application claims the benefit of U.S. Provisional Application No. 61/530,754 filed on Sep. 2, 2011, which is incorporated herein in its entirety.

TECHNICAL FIELD

This disclosure is in the field of image processing with topical application to interactive applications.

BACKGROUND

Prior art exists in the field—optical flow estimation is a classical way to perform motion detection in a scene between frames thereof, and can be used as control means for computer-based applications. This disclosure goes beyond current approaches by specifying a particular method of dealing with detected motion, which is proportional to the perceived universe of motion.

SUMMARY

In one embodiment, a method is provided for motion detection comprising acquiring a series of images comprising a current image and a previous image, determining a plurality of optical flow vectors, each representing movement of one of a plurality of visual elements from a first location in the previous image to a second location in the current image, storing the optical flow vectors in a current vector map associated with time information, and determining motion by calculating an intensity ratio between the current vector map and at least one prior vector map.

In another embodiment, a computer system, comprises a processing unit, a video camera, a video screen, and a memory, the memory comprising instructions that, when executed on the processing unit acquire a series of images comprising a current image and a previous image, determine a plurality of optical flow vectors, each representing movement of one of a plurality of visual elements from a first location in the previous image to a second location in the current image, store the optical flow vectors in a current vector map associated with time information, and determine motion by calculating an intensity ratio between the current vector map and at least one prior vector map.

In yet another embodiment, a tangible, computer readable media comprises computer instructions that, when executed on a processing unit, cause the processing unit to acquire a series of images comprising a current image and a previous image, determine a plurality of optical flow vectors, each representing movement of one of a plurality of visual elements from a first location in the previous image to a second location in the current image, store the optical flow vectors in a current vector map associated with time information, and determine motion by calculating an intensity ratio between the current vector map and at least one prior vector map.

DETAILED DESCRIPTION

This disclosure is of a computer system comprised of a processor, memory coupled to the processor, a video camera, a screen and a computer program or application.

The processor can be any kind of processor that will run the application, including CISC processors such as an x86 processor, or RISC processors such as an ARM processor.

The memory can be any type of memory, including RAM, ROM, EEPROM, magnetic memory such as floppy drives, hard disk drives, solid state drives, flash memory, and optical memory such as Compact Disks, Digital Versatile Disks, and Blu-Ray Disks.

The video camera can be any kind of video camera capable of outputting a digital signal. Specific resolutions and color sensitivity may vary depending on specific implementation purposes.

The screen can be any kind of screen that is capable of displaying a video stream.

The application is stored in the memory and is executed by the processor, inputting a real-time video stream from the video camera and outputting a video stream to the screen.

The application does not rely on specific hardware, rather just on generic hardware requirements as specified above, such that the application can be conveyed by and executed from different memory types on different hardware that is compliant with the requirements.

The application can be embodied in several ways. In this disclosure, there are exemplary embodiments of specific algorithms to build an interactive game where the bodies of a plural audience are used together as a unified control means, like a massive joystick.

Exemplary embodiments include algorithms both for crowd motion detection, and for statistical purposes which provide automatic measurements of audience participation ratio.

Exemplary embodiments of motion detection algorithms allow audiences to control applications by moving their arms and body sideways and/or vertically, the algorithms being able to recognize the directions left, right, up and down.

In an exemplary embodiment of the present disclosure, the algorithms allow the crowd to control lane based games, such as catch and dodge or brick breaker.

Figure 1:
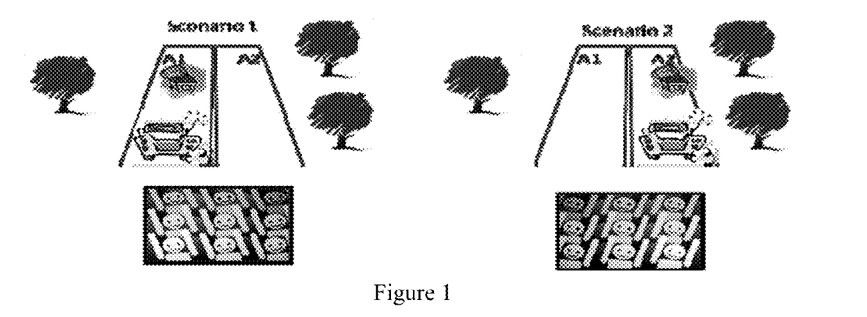
FIG. 1 is a representation of a computer game wherein the motion of a human audience's raised arms controls the motion of a car across two contiguous lanes.

FIG. 1 depicts an exemplary embodiment of this disclosure, wherein the sideways motion of human participants, and especially their arms, leads to the motion of a car between two alternate lanes A1 and A2.

Figure 2:
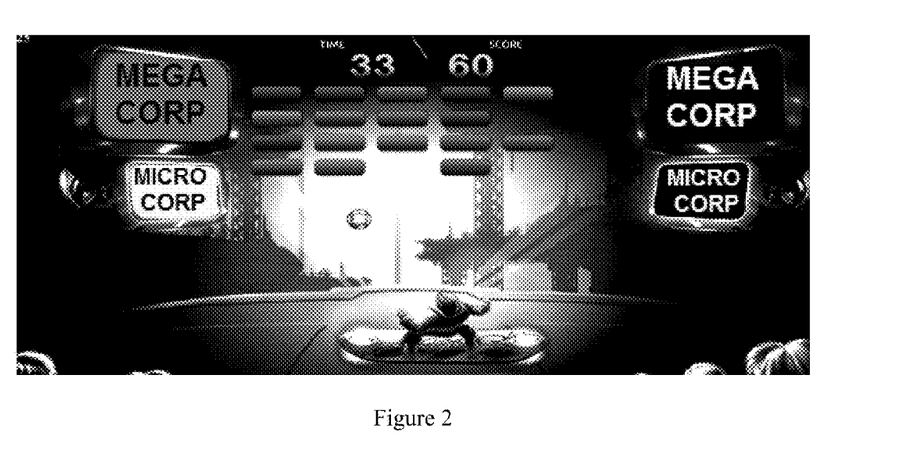
FIG. 2 is a representation of a computer game with sideways motion.

FIG. 2 depicts a game with sideways motion, suitable to be controlled by the methods and systems in this disclosure.

All algorithms herein disclosed are shown as indexes. Motion algorithms are divided into:
- a Motion Index to quantify the amount of motion of the crowd to be used in games with a continuous range of motion, such as brick-breaker-alike games;
- a Boolean Motion Index to trigger the alternative positions in lane-based games.

Both motion indexes are heuristic, adapting their values to the amount of motion captured by the camera. They work in the exact same way for a large crowd as for a single person.

The Motion Index uses Optical Flow as the key to measure pixel velocities between two frames and calculates an average value for the entire image.

For instance, a pyramidal LK Optical Flow, that has the advantage of being available in open source implementations like OpenCV, can be used. The Motion Index is, however, suited to use any algorithm within the Optical Flow family.

A short memory of average Optical Flow vectors is used to calculate an histogram, and the Motion Index is obtained by measuring the rank of the actual average velocity, which essentially represents a value between 0 and 100% according to the histogram shape.

Some filters are used to mitigate problems with outliers and to cull undesired areas like aisles in a film room. They are used to mask pixels out of optical flow average velocity calculation, and also to eliminate from the calculation high velocities that can represent a participant walking in front of the camera. Thus image processing flux can be summarized in FIG. 3.

Figure 3:
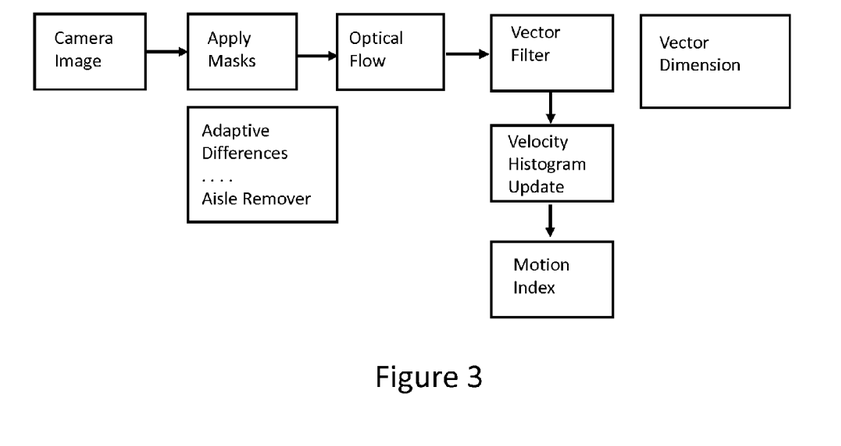
FIG. 3 is a flowchart of steps for computing a Motion Index, according to certain embodiments of this disclosure.

FIG. 3 depicts a method for calculating a Motion Index, with the following steps:
- capture of camera image in real-time;
- first filtering, wherein masks are applied to the real-time image, for instance to remove sections of the image that are not to be processed by an Optical Flow algorithm;
- Optical Flow algorithm application;
- second filtering, wherein a vector filter is applied to the optical flow vectors, for instance to remove vectors which length is above a certain threshold;
- an Optical Flow velocity histogram is kept for a certain period of acquisition, e.g. last 10 seconds, and updated with each iteration of the Motion Index;
- a Motion Index is obtained.

Motion Index calculation can take advantage of two different types of filters that can be applied before and after Optical Flow calculation, respectively.

The first filtering level is calculated by removing pixels from velocity calculation, and the second level is applied to filter out vectors calculated through Optical Flow.

Motion Index calculation does not require filtering; filtering is performed to improve application accuracy in some scenarios.

First filtering can be performed by two masks: Adaptive Differences and/or Aisle Remover.

Adaptive Differences Mask

Optical Flow algorithms can be influenced by extreme lighting conditions, e.g., weak light, heterogeneous lighting environment, and lateral lighting—weak lighting may increase Gaussian noise in the image captured by the camera, decreasing Optical Flow precision; heterogeneous and lateral lighting may cause two similar motions to be detected as having different intensity.

A difference-based filter between several consecutive frames can be used to eliminate those pixels not showing differences in the gray scale above a predefined threshold.

Aisle Remover Mask

The likely timing for an interactive advertisement in an event is for it to be shown prior to or during an interval to the event. Considering a space with seated places, such as a film room or public stands in an arena or court, there is a high probability that people will be walking towards and from their seats through aisles, hence it is important to eliminate these critical areas to minimize their effect on Optical Flow calculation, and potential consequences in application accuracy.

This filter can be produced by applying polygons to exclude areas from Optical Flow calculation.

Second filtering is important in some scenarios. For instance, in a film room with a camera placed near the screen (or projection room) pointing to spectator places, participants' influence in Optical Flow average will vary according to their distance to the camera. Even if the camera is hidden, there is always the possibility that someone will perceive its location and try to hack the interaction by obstructing the view to other participants, which may jeopardize the goal of the application.

This danger can be minimized by elimination of Optical Flow vectors longer than a predefined threshold relative to image resolution.

Motion Index Algorithm

Figure 4:
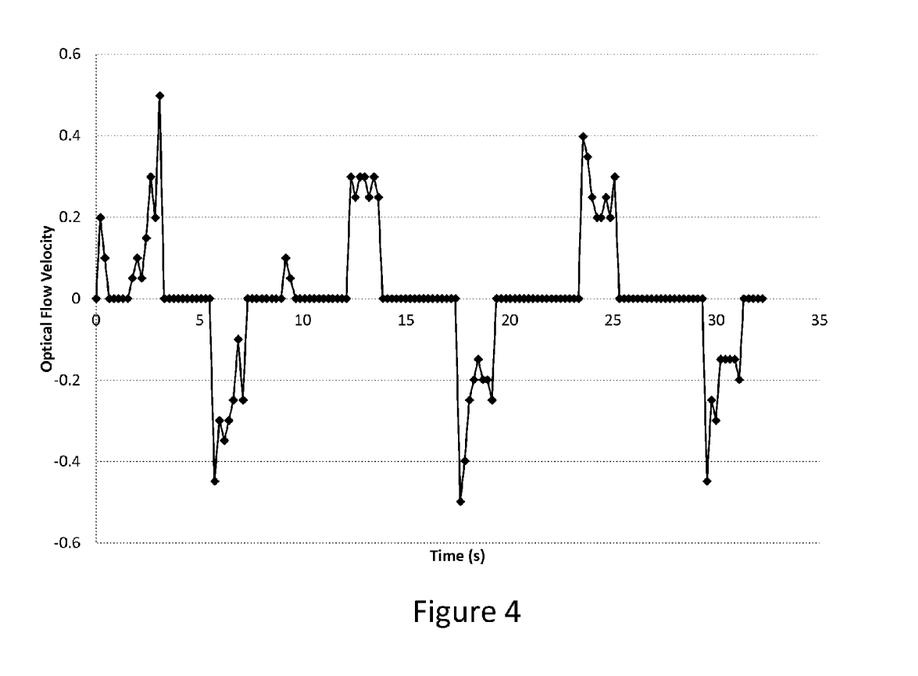
FIG. 4 is a graph of Optical Flow peaks over time for a human audience playing a catch and dodge game.

When people are playing a game like catch and dodge, they usually move in very precise moments with Optical Flow average velocity peaks alternating in their sign over time as people move left and right or up and down. FIG. 4 is a typical profile for this type of game.

The range of Optical Flow vectors can diverge according to the area that a player occupies in the captured image. This issue can be illustrated by a game scenario controlled by a single player and a setup with a camera capturing image from the center of a screen that is aimed to the seats or standing places in a event venue.

Figure 5:
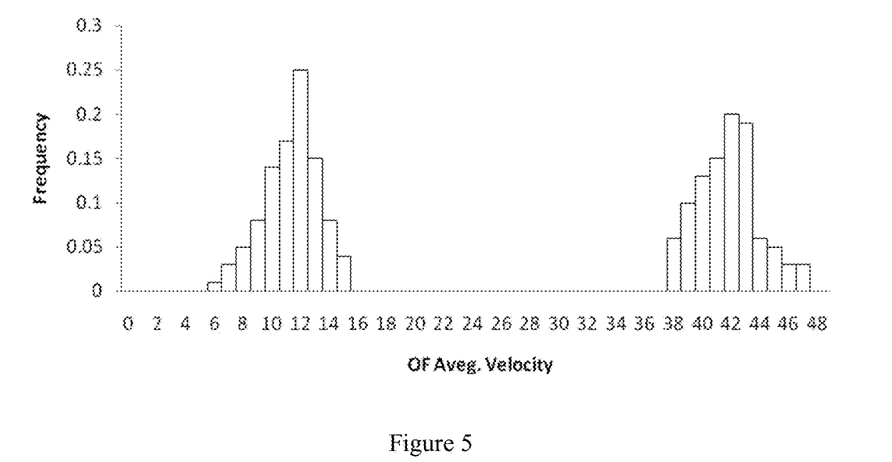
FIG. 5 is a bar chart histogram of Optical Flow values for a human playing a game at 2 different distances from the camera.

If the player plays the game in the front seats, and also in the back seats, the player's absolute velocities for both seat locations can be expressed by two histograms with distinct ranges like the ones in FIG. 5.

Spatial camera placement is a critical condition for effective interaction, and is dependent on the physical conditions of the space. A typical place for a camera is horizontally centered with a screen that is aimed at seats or standing places, either below or above the screen; if the space is then symmetric from the perspective of the screen, Optical Flow will have the same approximate range for positive and for negative vectors.

Figure 6:
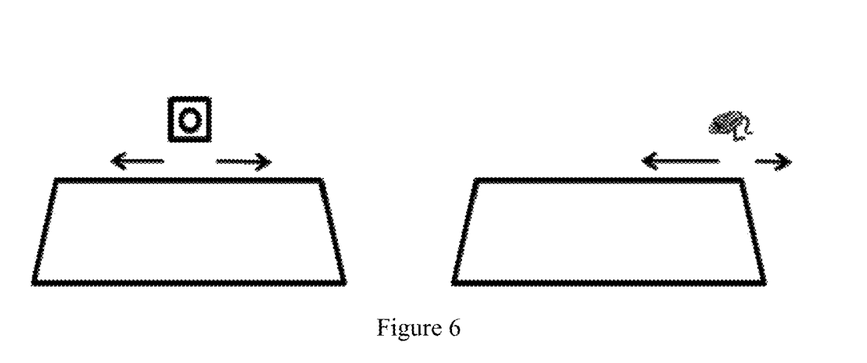
FIG. 6 is an illustration of the different length of Optical Flow vectors for a camera when placed in center, and placed in a corner, relative to the space of image acquisition.
Figure 7:
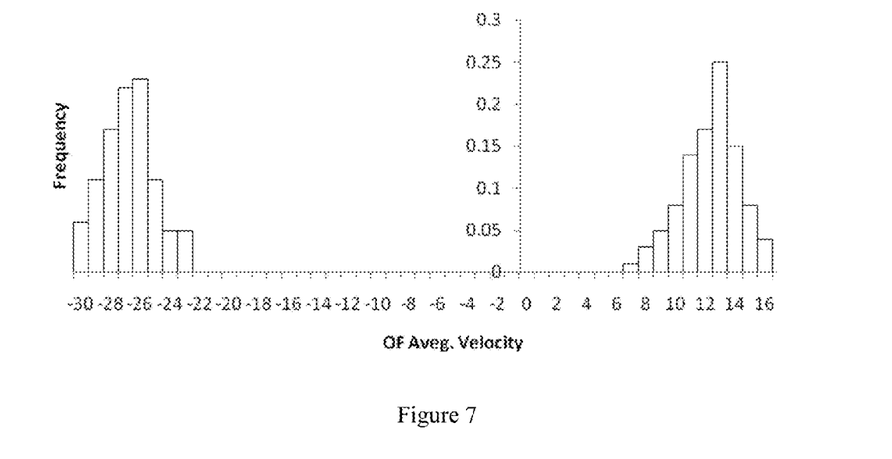
FIG. 7 is a bar chart histogram of Optical Flow values when a camera is placed in a corner relative to the space of image acquisition.

A centered placement is, however, not always possible, and sometimes the camera must be placed uncentered with the screen, e.g., in a left or right side corner of the wall where the screen is placed against. In this situation, Optical Flow vectors suffer some distortion by virtue of the angle of capture: the range and absolute value of both positive and negative Optical Flow vectors can change significantly as the angle increases. For example, if the camera is placed on the right corner of a wall, vectors created by people moving left and right to play a game will be longer when they move left than it is when they move right, as illustrated in FIG. 6 and by FIG. 7.

The Motion Index integrates all the foregoing considerations and assumes the least parameters possible. The Motion Index differentiates both positive and negative velocities by keeping a short memory of Optical Flow average velocities.

Both histograms are then updated as a new captured image arrives and is used to calculate the rank of the actual average Optical Flow velocity.

Considering the following Optical Flow vectors:

$$VPos_n = [u_0 \ldots u_{n-1}]$$

where $u_i$ is a positive velocity obtained in an instant≤t ($u_i > 0$), $$VNeg_n = [w_0 \ldots w_{n-1}]$$

and where $w_i$ is a negative velocity obtained in an instant≤t ($w_i < 0$);
the Motion Index uses the rank of the actual velocity expressed in percentage of a memory of positive and negative velocities (v) as:

$$M(v_t, VPos_n, VNeg_m) = \begin{cases} \frac{B + 0.5E}{n} \cdot 100 & \text{if } v_t > 0 \\ -\frac{B + 0.5E}{m} \cdot 100 & \text{if } v_t < 0 \\ 0 & \text{if } v_t = 0 \end{cases}$$

wherein:
B is the number of scores below $v_t$, if $v_t > 0$ or number of scores above $v_t$, if $v_t < 0$
E is the number of scores equal to $v_t$
n is the memory size of positive velocities
m is the memory size of negative velocities.

Figure 8:
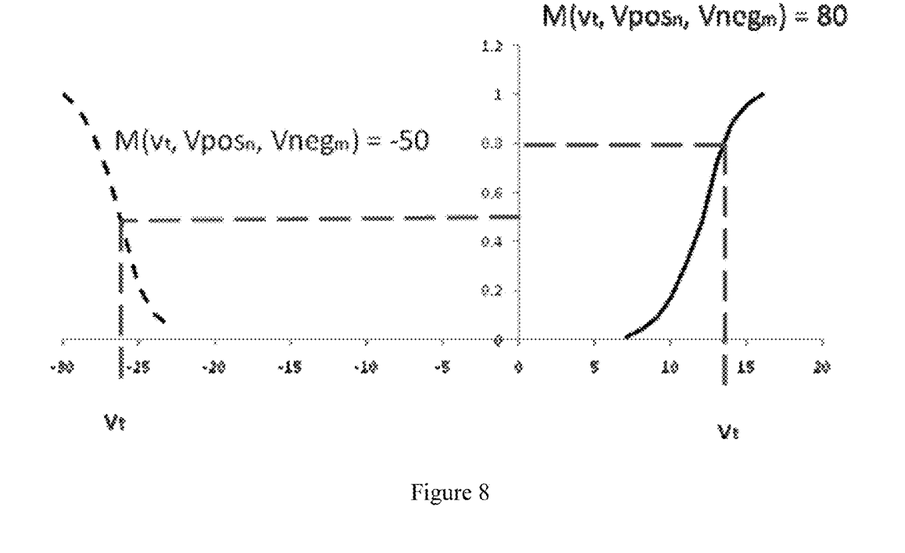
FIG. 8 is a graph of the statistical rank for Optical Flow values when a camera is placed in the corner relative to the space of image acquisition.

To illustrate the calculation of the Motion Index, one can assume FIG. 8 as a representation of histograms for both positive and negative Optical Flow average velocities. When a new velocity is obtained, it is checked if it is positive or negative and the corresponding histogram is updated.

Assuming the velocity is positive with vt=14 we will obtain an accumulated probability of approximately 0.8 and thus the Motion Index has a value of 80. On the other end if we assume the velocity as negative with vt=−26, the accumulated probability is 50 and, therefore, the Motion Index is −50.

Despite positive and negative velocities having very different scales, the Motion Index produces values within −100 and 100 which are adapted to the orientation of the camera.

On cause of the Motion Index using short memory Optical Flow velocity histograms, its value is always adapting to the amount of motion captured by the camera, which makes it heuristic. The return of rank of vt in a memory set as a percentage of the data set also makes it parameter-less and confined to a same possible range.

To make a two-dimensional (2D) Motion Index it suffices to apply it to each component of an Optical Flow vector independently. The Motion Index will then be a two-dimensional vector with values ranging from −100 to 100.

The above methods have been expressed as sensitive to a left and right sides from the perspective of a camera. Equally, up and down can be used by the same methods.

This can be of use in scenarios such as a sports arena with 2 levels for the public, or an event room with a stage wherein there is a general public section at the floor level and there are cabins at least one other superior level. In the latter case, the general public section can typically accommodate more spectators than the cabin section—still, by virtue of the Motion Index, the cabin section will be able to influence the application or game just as much as the general audience.

In a practical, exemplary embodiment to this disclosure there is a public film room in a cinema, wherein a large screen is aimed at a public seating section. A camera is placed below the screen, and is connected to a computer wherein a processor and a memory are lodged to run and store applications, respectively.

Before the film begins, an application is run from the computer, that is displayed unto the screen and shows a representation of a man on a hoverboard seen from behind, similarly to FIG. 2, slightly fluctuating from left to right.

A message appears on the screen which reads "HOLD YOUR ARMS UP", followed by "CONTROL THE MOTION BY SWAYING YOUR ARMS".

People on the public seating section sway their arms and thus influence the motion of the hoverboards.

A person passing in front of the screen momentarily obstructs the camera, and the hoverboard stays still until the person is no longer obstructing the camera, since the application determines that the motion of the obstructing person is above a discarding threshold.

Boolean Index Algorithm

The Motion Index has a continuous nature, allowing its use in measuring the actual amount of motion being captured by the camera in real time, and not just a subset thereof. It can be used by games requiring continuous motion to be played, like brick breaker type games. However, lane-based games, such as the one depicted in FIG. 2, require discrete values such as simple "left" or "right", as people move to catch good items or to avoid obstacles.

Given that it includes orientation, the Motion Index can be used to calculate these Boolean motions. To determine when to trigger a left or right motion, an absolute threshold for the Motion Index is specified, above which an order is given.

For example, assuming a threshold of 70%, if $M(v_t, VPos_n, VNeg_m) = -89$, a left order is produced.

Figure 9:
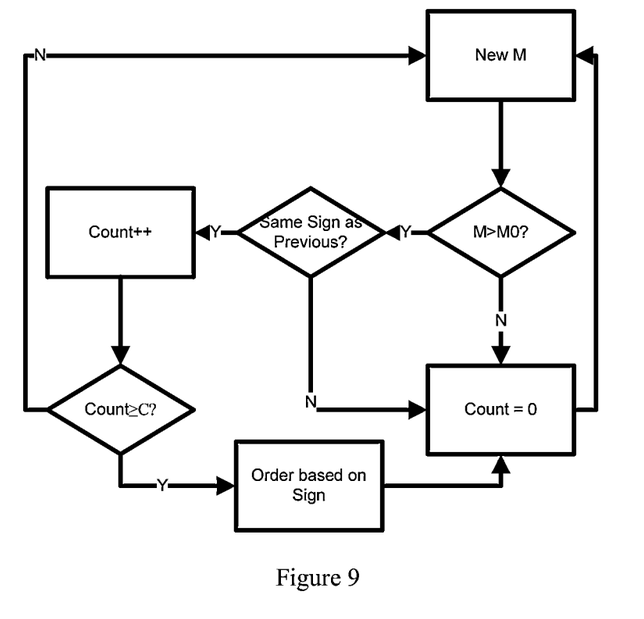
FIG. 9 is a flowchart of an accuracy-improvement algorithm for a Boolean Index, according to certain embodiments of this disclosure.

For increased accuracy, the trigger can be the occurrence of a predefined number of consecutive values (C) above some absolute threshold for the Motion Index ($M_0$), following the flow in FIG. 9.

Taking M as, $$M(v_t, VPos_n, VNeg_m),$$

for each new value of M that is superior to M0 with a sign (i.e., negative or positive) equal to the previous value of M increments a counter. Upon the counter reaching a parameter C, an order is given based on the negative or positive sign of the set of C number of M values with the same sign.

This method avoids possible outliers coming from a lighting anomaly or noise that were not properly filtered by the masks previously specified.

Statistics for crowd participation can be of interest for advertising in situations that advertisements can be displayed, e.g. a cinema film room.

In an exemplary embodiment of this disclosure, a Crowd Participation Index provides a statistical measure to quantify this success, again by use of Optical Flow.

Figure 10:
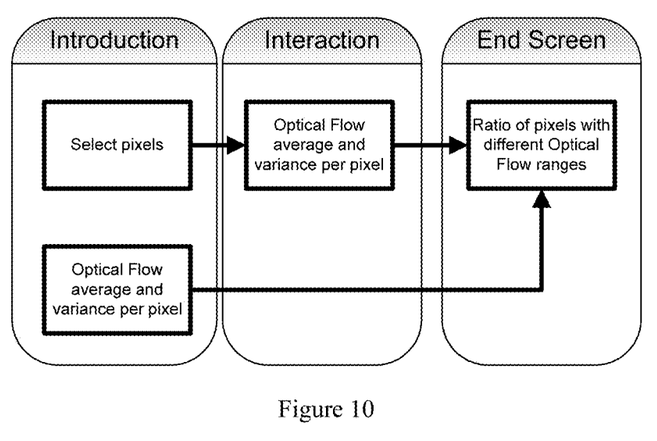
FIG. 10 is a flowchart for a Crowd Participation Index, according to certain embodiments of this disclosure.

The algorithm for a Crowd Participation Index is carried out assuming that an interactive advertisement has at least an Introduction phase for explaining the interaction, an Interaction, and an End Screen, all phases depicted in FIG. 10.

In the Introduction screen all pixels are sampled randomly over time and their correspondent Optical Flow set of values kept in memory.

Optical Flow is filtered in the exact same way as for the Motion Index calculation with the exception of differences that are applied to select the pixels that will be used in the statistical comparison of Optical Flow vectors during Introduction and Interaction time. If the Optical Flow average value is significantly different, and the average is higher during Interaction time, it is considered different. The index is given by the ratio of pixels with statistical higher average relative to all the pixels selected for the comparison.

All pixels that are not being explicitly filtered out are trial candidates for Optical Flow comparison. Pixels with differences in the color space are used as more likely candidates to have people moving. Even if an audience is not interacting with the advertisement during Introduction, people will be slightly moving their heads, arms and body, possibly creating differences in the color space.

Pixels are hence selected for statistical motion comparison by checking if they cross a specific threshold as specified for the Adaptive Differences mask. If they cross that threshold at least (d) times, they are selected for Optical Flow statistical comparison.

Several mathematical approaches can be used to compare Optical Flow during Introduction and Interaction times. Two possibilities are:

Analysis of Variance (ANOVA), a technique often used to compare averages through their variability range. A single factor ANOVA is applied for each pixel selected for Optical Flow vector average comparison. If they are statistically not equal and the average is higher during Interaction time, the analyzed pixel is used for player counting;

simple comparison of percentiles; for example—if percentile 50 of the absolute value of Optical Flow vectors during Interaction time is higher than percentile 75 during Introduction time, the analyzed pixel is used for player counting.

The disclosed embodiments vie to describe certain aspects of this disclosure in detail.

Other aspects may be apparent to those skilled in the art that, whilst differing from the disclosed embodiments in detail, do not depart from this disclosure in spirit and scope.

SUMMARY

In a computer-implemented-method, a Motion Index is computed from vectors obtained through an Optical Flow algorithm, consisting of an histogram thereof.

The Motion Index is used to determine maximum motion for an image or a part thereto, enabling the calculation of the proportion of motion in any point in time, relative to the maximum motion. Thus, any motion can be attributed a relative strength proportional to the maximum, which has the virtue of allowing for consistent proportional interaction for audiences of all sizes.

Areas that are not relevant or are source of noise can be excluded from the Motion Index and the image capture, and out-of-boundaries motion can be discarded.

Statistics are computed for determining a participation ratio for an audience.

What is claimed is:

1. A method for motion detection comprising:
acquiring a series of images comprising a current image and a previous image;
determining a plurality of optical flow vectors, each representing movement of one of a plurality of visual elements from a first location in the previous image to a second location in the current image;
determining and storing average velocities for said plurality of optical flow vectors for a plurality of different time points; and
using said average velocities, calculating a motion index, wherein the motion index can have positive or negative values depending on motion direction.

2. The method of claim 1, further comprising, prior to determining the plurality of optical flow vectors, applying a difference-based filter between consecutive images in the series of images.

3. The method of claim 1, further comprising, prior to determining the plurality of optical flow vectors, applying a polygon-based filter delimiting areas of the series of images to be excluded when determining the plurality of optical flow vectors.

4. The method of claim 1, wherein determining a plurality of optical flow vectors comprises the application of a pyramidal Lucas-Kanade algorithm.

5. The method of claim 1,
further comprising calculating an intensity ratio,
wherein calculating the intensity ratio comprises the application of the following formula:

$$M(v_t, VPos_n, VNeg_m) = \begin{cases} \dfrac{B+0.5E}{n} \cdot 100 & \text{if } v_t > 0 \\ -\dfrac{B+0.5E}{m} \cdot 100 & \text{if } v_t < 0 \\ 0 & \text{if } v_t = 0 \end{cases}$$

wherein:
B is the number of scores below $v_t$, if $v_t>0$ or number of scores above $v_t$, if $v_t<0$
E is the number of scores equal to $v_t$
n is the memory size of positive velocities
m is the memory size of negative velocities
v are velocities
considering the Optical Flow vectors $$VPos_n=[u_0 \ldots u_{n-1}]$$

where $u_i$ is a positive velocity obtained in an instant <t ($u_i>0$), $$VNeg_n=[w_0 \ldots w_{n-1}]$$

and where $w_i$ is a negative velocity obtained in an instant <t ($w_i<0$).

6. The method of claim 1, further comprising storing the optical flow vectors and, prior to storing the optical flow vectors, eliminating optical flow vectors with an absolute value less than a predefined threshold relative to image resolution.

7. A computer system, comprising:
a processing unit;
a video camera;
a video screen; and
a memory, and instructions stored in the memory that, when executed on the processing unit, cause the computer system to:
acquire a series of images comprising a current image and a previous image;
determine a plurality of optical flow vectors, each representing movement of one of a plurality of visual elements from a first location in the previous image to a second location in the current image;
determine and store average velocities for said plurality of optical flow vectors for a plurality of different time points; and
using said average velocities, calculating a motion index, wherein the motion index can have positive or negative values depending on motion direction.

8. The system of claim 7, wherein the memory further comprises instructions that, when executed on the processing unit, prior to determining the plurality of optical flow vectors, apply a difference-based filter between consecutive images in the series of images.

9. The system of claim 7, wherein the instructions stored in the memory further comprise instructions that, when executed on the processing unit, prior to determining the plurality of optical flow vectors, apply a polygon-based filter delimiting areas of the series of images to be excluded when determining the plurality of optical flow vectors.

10. The system of claim 7, wherein the instructions to determine a plurality of optical flow vectors further comprise instructions implementing the application of a pyramidal Lucas-Kanade algorithm.

11. The system of claim 7,
wherein said instructions stored in the memory, when executed, further cause the computer system to calculate an intensity ratio,
wherein the instructions to calculate the intensity ratio comprise instructions implementing the following formula:

$$M(v_t, VPos_n, VNeg_m) = \begin{cases} \dfrac{B+0.5E}{n} \cdot 100 & \text{if } v_t > 0 \\ -\dfrac{B+0.5E}{m} \cdot 100 & \text{if } v_t < 0 \\ 0 & \text{if } v_t = 0 \end{cases}$$

wherein:
B is the number of scores below $v_t$, if $v_t>0$ or number of scores above $v_t$, if $v_t<0$
E is the number of scores equal to $v_t$
n is the memory size of positive velocities
m is the memory size of negative velocities
v are velocities considering the optical flow vectors $VPos_n = [u_0 \ldots u_{n-1}]$ where $u_i$ is a positive velocity obtained in an instant <t ($u_i>0$), $VNeg_n = [w_0 \ldots w_{n-1}]$ and where $w_i$ is a negative velocity obtained in an instant <t ($w_i<0$).

12. The system of claim 7, wherein the instructions stored in the memory further comprise instructions that, when executed on the processing unit, store the optical flow vectors and, prior to storing the optical flow vectors, eliminate optical flow vectors with an absolute value less than a predefined threshold relative to image resolution.

13. A non-transitory computer readable medium, and computer instructions stored on the computer readible medium that, when executed on a processing unit, cause the processing unit to:
acquire a series of images comprising a current image and a previous image;
determine a plurality of optical flow vectors, each representing movement of one of a plurality of visual elements from a first location in the previous image to a second location in the current image;
determine and store average velocities for said plurality of optical flow vectors for a plurality of different time points; and
using said average velocities, calculate a motion index, wherein the motion index can have positive or negative values depending on motion direction.

14. The medium of claim 13, further comprising instructions that, when executed on the processing unit, prior to determining the plurality of optical flow vectors, apply a difference-based filter between consecutive images in the series of images.

15. The medium of claim 13, further comprising instructions that, when executed on the processing unit, prior to determining the plurality of optical flow vectors, apply a polygon-based filter delimiting areas of the series of images to be excluded when determining the plurality of optical flow vectors.

16. The medium of claim 13, wherein the instructions to determine a plurality of optical flow vectors further comprise instructions implementing the application of a pyramidal Lucas-Kanade algorithm.

17. The medium of claim 13,
wherein said computer instructions, when executed, further cause the processing unit to calculate an intensity ratio,
wherein the instructions to calculate the intensity ratio comprise instructions implementing the following formula:

$$M(v_t, VPos_n, VNeg_m) = \begin{cases} \dfrac{B+0.5E}{n} \cdot 100 & \text{if } v_t > 0 \\ -\dfrac{B+0.5E}{m} \cdot 100 & \text{if } v_t < 0 \\ 0 & \text{if } v_t = 0 \end{cases}$$

wherein:
B is the number of scores below $v_t$, if $v_t>0$ or number of scores above $v_t$, if $v_t<0$
E is the number of scores equal to $v_t$
n is the memory size of positive velocities
m is the memory size of negative velocities
v are velocities considering the optical flow vectors $VPos_n = [u_0 \ldots u_{n-1}]$ where $u_i$ is a positive velocity obtained in an instant <t ($u_i>0$), $VNeg_n = [w_0 \ldots w_{n-1}]$ and where $w_i$ is a negative velocity obtained in an instant <t ($w_i<0$).

18. The medium of claim 13, further comprising instructions that, when executed on the processing unit, store the optical flow vectors and, prior to storing the optical flow vectors, eliminate optical flow vectors with an absolute value less than a predefined threshold relative to image resolution.

* * * * *